Feb. 26, 1952  J. W. LAWSON ET AL  2,587,178
POLARITY REVERSING SWITCH
Filed April 26, 1947  3 Sheets-Sheet 1
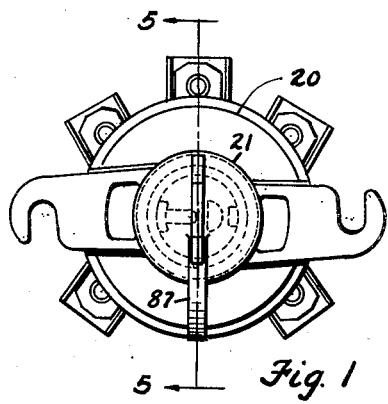
Fig. 1
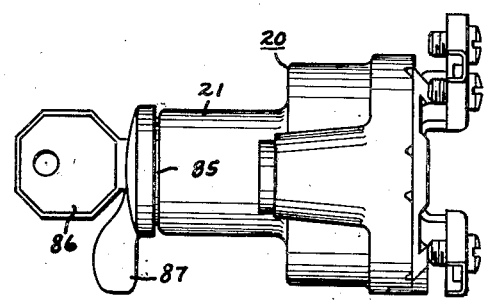
Fig. 2
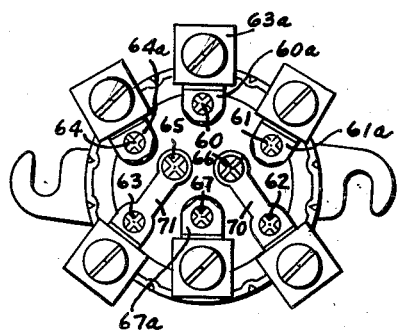
Fig. 3
Fig. 4
INVENTORS
JOHN W. LAWSON AND
BY William Earl Brown
Spencer, Hardman & Fehr
Their ATTORNEYS Feb. 26, 1952     J. W. LAWSON ET AL     2,587,178
POLARITY REVERSING SWITCH
Filed April 26, 1947     3 Sheets-Sheet 2
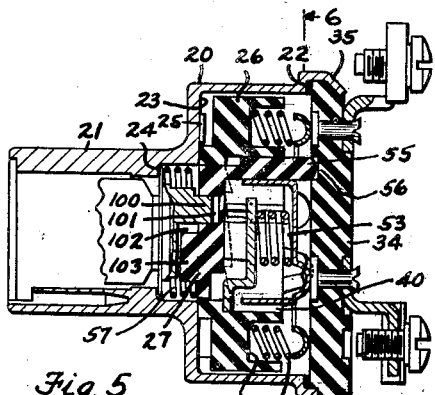
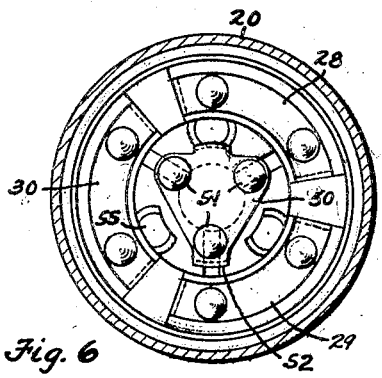
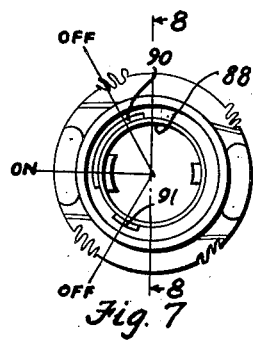
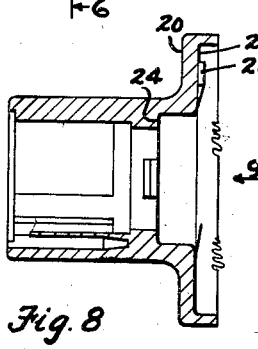
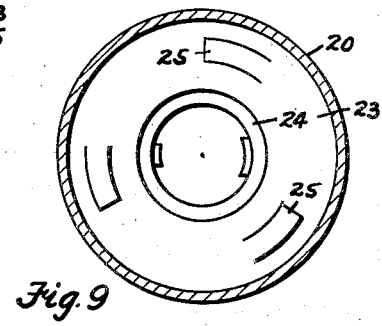
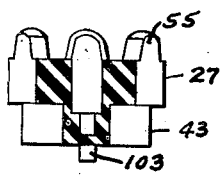
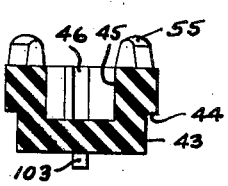
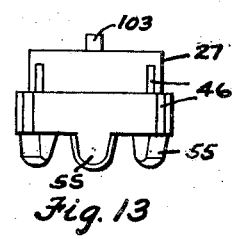
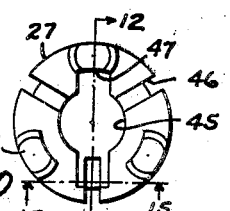
INVENTORS
JOHN W. LAWSON AND
BY William Earl Brown
Spencer, Hardman & Fehr
Their ATTORNEYS Feb. 26, 1952 J. W. LAWSON ET AL 2,587,178
POLARITY REVERSING SWITCH
Filed April 26, 1947 3 Sheets-Sheet 3

INVENTORS
JOHN W. LAWSON AND
BY WILLIAM EARL BROWN
*Spencer, Hardman & Fehr*
Their ATTORNEYS Patented Feb. 26, 1952

2,587,178

UNITED STATES PATENT OFFICE 2,587,178

POLARITY REVERSING SWITCH

John W. Lawson and William Earl Brown, Anderson, Ind., assignors to General Motors Corporation, Detroit, Mich., a corporation of Delaware Application April 26, 1947, Serial No. 744,240

10 Claims. (Cl. 200—7)

This invention relates to improvements in electric switches of the rotary type, and more particularly to the mechanical construction thereof.

Electric switches of the rotary type are used in installations of a character wherein the unidirectional flow of current in the ignition circuit, especially through the timer contacts, tends to cause pitting of the contacts. This unidirectional flow of current through the contacts is quite objectionable with the result that the contacts become pitted within a relatively short time thereby necessitating replacement.

One object of the present invention is to provide a rotary switch with mechanism for counteracting the aforementioned tendency and for changing the current flow through the timer contacts each time the switch is moved to its closed position in order that the pitting of the timer contacts is reduced to a minimum.

Another object of the present invention is to provide a rotary switch of the foregoing described character which is simple in construction, durable in use, efficient and positive in operation, and economical in manufacture.

Further objects and advantages of the present invention will be apparent from the following description, reference being had to the accompanying drawing, wherein a preferred embodiment of the present invention is clearly shown.

In the drawings:

Fig. 1 is a front view of the switch embodying the present invention.

Fig. 2 is a side view of the switch.

Fig. 3 is a rear view of the switch.

Fig. 4 is a diagrammatic plan of a conventional ignition system with the switch included therein.

Fig. 5 is a sectional view taken on line 5—5 of Fig. 1, but on a larger scale.

Fig. 6 is a sectional view taken on line 6—6 of Fig. 5.

Fig. 7 is a fragmentary detail view in elevation of the casing for the switch.

Fig. 8 is a sectional view of the casing taken on the line 8—8 of Fig. 7.

Fig. 9 is a view looking in the direction of the arrow 9 in Fig. 8.

Fig. 10 is a detail view in elevation, of the rear of one of the contact supports.

Fig. 11 is a detail view in elevation, of the front of the contact support shown in Fig. 10.

Fig. 12 is a sectional view taken on line 12—12 of Fig. 10.

Fig. 13 is a side view of the support shown in Figs. 10 and 11.

Figs. 14 and 15 are sectional views taken on lines 14—14 and 15—15, respectively, of Figs. 11 and 10 respectively.

Figure 16:
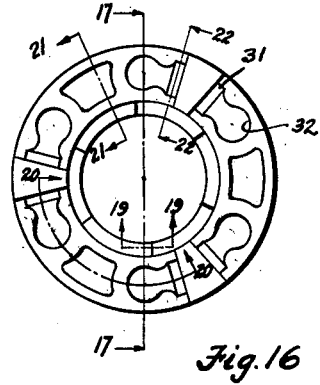

Fig. 16 is a detail view in elevation of the front of another contact support.

Figure 17:
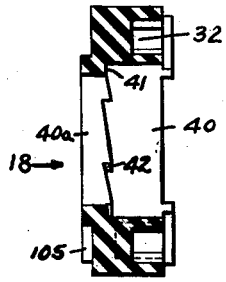

Fig. 17 is a sectional view taken on line 17—17 of Fig. 16.

Figure 18:
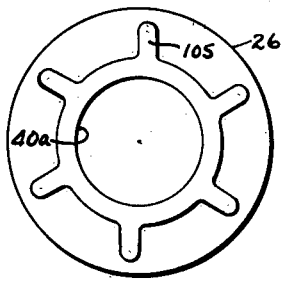

Fig. 18 is a detail view in elevation of the rear of the support shown in Fig. 16, and looking in the direction of the arrow 18 in Fig. 17.

Figure 19:

Fig. 19 is a sectional view taken on line 19—19 of Fig. 16.

Figure 20:
Figure 21:
Figure 22:
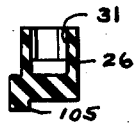

Figs. 20, 21, and 22 are sectional views taken on lines 20—20, 21—21, and 22—22, respectively, of Fig. 16.

Figure 23:
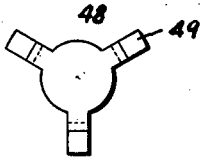

Fig. 23 is a detail view in elevation, of a ratchet plate.

Figure 24:

Fig. 24 is a side view of the ratchet plate shown in Fig. 23.

Referring to the drawings, 20 designates a tubular casing or body having a shank or boss 21. The body is counterbored to provide internal shoulders 22, 23 and 24. The shoulder 23, in this instance, is provided with three ratchet teeth 25 spaced 120° apart. One end of the body 20, between the shoulders 22 and 23, provides a housing for a rotatable outer contact support or carrier 26 and a rotatable inner contact support or carrier 27. The outer face of the contact support 26 carries three contacts, 28, 29 and 30 each having two contact buttons and two tangs received by respective sockets 31, see Fig. 16, provided by the carrier 26. This contact support is also provided with sockets 32 between each pair of sockets 31. The sockets 32 provide seats for springs 33 which urge the contacts 28, 29 and 30 toward a switch cover or stationary contact support 34 retained on the shoulder 22 of the body 20 by bending portions or tangs of the body inwardly, as at 35, over and against the support 34.

Before the support 34 is fixed to the housing the rotatable inner contact support 27 is assembled with the outer contact support 26. The outer support 26 is provided with a counterbored opening 40 to provide an annular shoulder 41 having a series of ratchet teeth 42 thereon. In this instance the shoulder 41 is provided with six teeth. The inner support 27 is rotatably and longitudinally supported in the opening 40. The support 27 is provided with a reduced portion 43 to provide a shoulder 44. The reduced portion 43 is received by the smaller diameter of the opening 40a. The inner support 27 is provided with a recess 45 of one face thereof and has three radial notches 46 extending from the inner walls of the recess 45 to the periphery of the support and a pair of diametrically opposite recesses 47.

The recess 45 receives a metal ratchet plate 46 having a flat central portion which is housed within the recess 45, and three relatively narrow portions or arms 49 which extend outwardly in substantially radial directions from the flat portion and the free ends are bent axially out of the plane of the flat portion. The free ends of the arms cooperate with the teeth 42 on the shoulder 41 to provide a one-way drive connection for the carrier 26 by the carrier 27. A contact or bridging member 50 having three contact buttons 51 and two arms 52, see Fig. 6, which are received by the recesses 47. The ratchet plate 46 is urged toward the bottom of the recess 45 so that the free ends of the arms engage the ratchet teeth and the contact 50 is urged toward the cover 34 by a compression spring 53 disposed between the plate 46 and the contact 50.

The contact support 27 is provided with three projections or lugs 55 which cooperate with three detents 56 in the cover 34 to hold the support in various positions. The support is urged toward the cover by a compression spring 57 having one end resting on the shoulder 24 and having the other end engaging the support 27.

The cover 34 carries stationary contacts arranged into two concentric rows, the outer rows including head rivets 60, 61, 62, 63 and 64 and the inner row comprising head rivets 65, 66 and 67. The heads of the rivets are preferably flush with the inner face of the cover. The shanks of the rivets 60, 61, 64 and 67 project beyond the outer face of the cover and extend through apertures provided in respective conducting straps 60a, 61a, 64a, and 67a, while the outer ends of rivets 62 and 66 are connected to a conducting strap 70 and the outer ends of the rivets 63 and 65 are connected to a conducting strap 71.

The switch as thus far described is particularly used in an ignition circuit of an internal combustion engine, and is so mounted and connected with respect to the timer contact that each time the ignition circuit is closed the direction of flow of current through the timer contact will be reversed.

Referring to the wiring diagram, Fig. 4, the stationary contact 60 is connected by a lead 72 with an ignition coil 73 grounded at 74. The contact 61 is connected by a lead 75 with a contact 77 of a timer 76 which periodically engages contact 79. Contact 79 is connected to the contact 64 by a lead 80. One or the other of contacts 77, 79 is movable. A storage battery 81 is grounded at one terminal and the other terminal is connected with the contact 67 by a wire 82. The contacts 62 and 63 may be connected to any suitable electrical devices if desired.

The boss 21 of the body 20 receives a tumbler lock cylinder 85 operable by a suitable key 86. The cylinder 85 also carries a handle 87 to turn the cylinder 85 from an "off" to an "on" position or vice versa. Referring to Fig. 7, the boss is provided with cylindrical bearing surface 88 in which the outer surface of the lock cylinder fits and is rotated in the conventional manner. The boss 21 is also provided with arcuate slots 90 and 91 into which a keeper provided by the lock cylinder may project and reciprocate as the key 86 is inserted or withdrawn from the tumbler cylinder.

When the keeper of the lock cylinder is in the slot 90 the cylinder can be rotated 60° from the "off" to "on" position by the handle, but when the keeper is in the slot 91 the lock cylinder is in its second "off" position and cannot be moved to "on" position until the key is inserted to remove the keeper from the slot 91. It is pointed out here that when the lock cylinder as assembled with the boss stop provisions are provided between the cylinder and the boss to limit the angle of rotation of the cylinder to 120°, thus the cylinder cannot rotate beyond the two "off" positions when the key is in the cylinder and is manipulated to turn the cylinder.

Since the present invention resides more particularly in the switch structure for changing the polarity each time the lock cylinder is actuated from the "off" position to the "on" position further description of the locking cylinder is deemed unnecessary.

When ignition is required the lock cylinder is turned from the "off" position to the "on" position to drive the contact support 26. For this purpose the rear end of the lock cylinder is provided with a non-circular lug 100 that projects into a complementary recess 101 provided by the support. The lock cylinder is also provided with a recess 102 which receives an extension 103 formed on the carrier 27.

When the back cylinder is actuated in a counterclockwise direction, as viewed in Fig. 1, it will drive the support 26 in a counterclockwise direction because the free ends of fingers 49 of plate 46 cooperate with the teeth 42 of the support 26 to drive the support 26, and after a predetermined angular distance the projection 55 will enter into the detents 56. In this way the movable contact carrier 27 of the switch will be yieldingly maintained in various positions. When it is desired to move the switch from "on" to "off" position, the lock cylinder can be moved in either clockwise or counterclockwise direction. When the lock cylinder is moved in the clockwise direction fingers 49 will slide over teeth 47, but the support 26 is prevented from turning in the clockwise direction because extensions 105, formed on one side of support, see Fig. 18, abut teeth 25 provided on shoulder 23 of body 20.

Each time the switch is operated from "off" to "on" or "on" to "off" in a counterclockwise direction as viewed in Fig. 1 the polarity of the timer contacts is reversed, causing a minimum of contact pitting. When the switch is in its closed position as shown in Fig. 4, the path of current from the storage battery will be as follows. Current will flow from the positive side of the battery 81 through lead 82 to contact 67, bridging member 50, strap 71, contact 63, contact 30, contact 64 through lead wire 80 to contact 79, contact 77, lead wire 75, contacts 61, 28 and 60, and thence through coil 73 to ground 74. When handle or key reverses its movement in the clockwise direction to the "off" position, the contacts 28, 29 and 30 will remain in the positions illustrated, but the the bridging member 50 will be moved in a clockwise direction to "off" position. This condition exists due to the fact that the teeth 25 prevent the support 26 from moving in the reverse direction, but when the switch is again moved to the "on" position the support through the plate 46 drives the support 26 60° thus changing the position of the contacts 28, 29 and 30, causing the contact 28 to bridge contacts 61—62, and contact 30 to bridge contacts 64—60. This will be apparent when the switch is moved in a clockwise direction as viewed in Fig. 4. In these positions of the contacts 30 and 28 current will flow from the battery 81 to contact 67, bridging member 50, contact 68, strap 70, contacts 62, 28, 61, lead 75, contact 77, contact 79, lead 80, contacts 64, 30, 60 and thence through coil 75 to ground 76.

In this above construction of the switch it will be noted the switch has two "off" positions and one "on" position and it is possible to manipulate the switch from "off" to "on" position by the handle without the use of a key. In order to do this, the operator inserts the key in the lock cylinder causing the keeper to be within the cylinder. Then the cylinder is rotated to "on" position and then the key can be removed causing the keeper to lie in the groove 90 after which the handle can move the cylinder to "off" position and then to "on" position. It is pointed out that on each movement of the lock cylinder to "on" position when the keeper is in groove 90 the support 26 will drive the support 27 60° to change the position of the contacts 28, 29, and 30. In case the operator desires to lock the switch so that it cannot be manipulated to "on" position by the handle the operator inserts the key in the cylinder and then moves the lock cylinder in the "off" position which will permit the keeper provided by the lock cylinder to register with the groove 91 and then remove the key. In this position when the key is removed the keeper will automatically move the lock cylinder into the groove 91 therefore the lock cylinder cannot be rotated by the handle 87 in the reverse direction to the "on" position without first inserting the key to free the keeper of the groove 91.

While the embodiment of the present invention as herein disclosed, constitutes a preferred form, it is to be understood that other forms might be adopted, and although the description limits the switch to the reversal of the polarity of ignition timer contacts it is to be understood the switch may be used for other purposes requiring a reversing or circuit selecting switch, all coming within the scope of the claims which follow.

What is claimed is as follows:

1. An electric switch comprising in combination; a housing; a closure for the housing supporting two circular rows of stationary contacts; a pair of concentric rotors mounted for axial and angular movements respective to each other within the housing the outer rotor supporting a plurality of biased contacts each contact capable of bridging a pair of the outer row of contacts on the support and the inner rotor supporting a yieldable contact capable of bridging all of the stationary contacts of the inner row of contacts simultaneously; ratchet provisions between the rotors whereby both rotors move together in one direction of rotation only; ratchet provision between the outer rotor and the housing to prevent reverse movement of the outer rotor upon reverse movement of the inner rotor; means for actuating the inner rotor in either direction of rotation; spring means for urging the inner rotor against the closure; and means for maintaining the inner rotor in various positions, said means including arms formed integral with inner rotor capable of extending into recesses provided by the closure.

2. An electric switch comprising in combination; a cup-shaped casing; a pair of concentric contact carriers, one supported within the other and adapted for angular and axial movements with respect to each other within the casing; ratchet provisions between the carriers whereby both carriers turn together in one direction of rotation, said provisions permitting the inner carrier to move in the opposite direction of rotation relative to the outer carrier; ratchet provisions between the outer carrier and the bottom of the casing for preventing reverse rotation of the outer carrier upon reverse movement of the inner carrier; means for actuating the inner carrier in either direction of rotation; and means for limiting the angular movements of the inner carrier whereby the inner member must be reversed a certain angular distance before the ratchet provisions between the carriers is operative to actuate the outer carrier further in its angular movement.

3. An electric switch comprising in combination; a cup-shaped casing having a series of ratchet teeth in the bottom of the casing; a pair of concentric contact carriers mounted for angular movements within the casing, one of said carriers being arranged for step-by-step movements in one direction of rotation only while the other carrier is mounted for oscillating movements on either side of a medial position; ratchet provisions between the carriers whereby both carriers move together in said one direction only; extensions provided by the first mentioned carrier and cooperating with the ratchet teeth on the bottom of the casing for preventing reverse movement of the first mentioned carrier upon reverse movement of the other carrier; key control means for actuating the carrier capable of oscillating movements; and means for limiting angular movements of the actuating means on each side of the medial position, the angular movement of the actuating means being from one side position while a key is inserted in the actuating means to the other side position, the rotating movement of said actuating means being limited from one side position to the medial position when the key is removed and when the key is inserted the rotating movement can be extended from the medial position to the other side position said movement causes the first mentioned carrier to turn step-by-step in said one direction said actuating means being nonrotatable for operation of the oscillatable carrier upon removal of the key when the elements are in the other side position.

4. An electric switch comprising in combination; a cup-shaped casing having a series of ratchet teeth; a closure for the casing supporting two circular rows of stationary contacts; means for connecting contacts of one row with contacts of the other row; a pair of concentric rotors located within the casing and capable of moving axially and angularly relative to each other, said outer rotor having inner ratchet teeth; slidable circuit closing means carried by each rotor; spring means supported within each rotor for urging same and their respective circuit closing means apart; a plate supported by the inner rotor and having arms extending through notches, the free ends of the arms cooperating with the inner ratchet teeth of the outer rotor to drive same in one direction of rotation; spring means for urging the inner rotor toward the closure; cooperating means provided by the inner rotor and the closure to maintain yieldingly the inner rotor in various positions; means for driving the inner rotor in either direction of rotation; and extensions on the outside of the outer rotor adapted to cooperate with the ratchet teeth on the casing to prevent reverse movement of the outer rotor upon reverse movement of the inner rotor.

5. An electric switch comprising in combination; a casing; a closure for the casing supporting two concentric circular rows of stationary contacts; means for connecting at least two contacts of each row together; a pair of concentric rotors located within the casing; a plurality of biased contacts carried by the outer rotor for engaging a pair of contacts on the outer row of stationary contacts; biased bridge means driven by the inner rotor for engaging all of the inner row of contacts simultaneously; means for periodically causing the rotors to move reciprocably in the longitudinal direction as they are rotated in one direction while simultaneously restraining the outer rotor from rotating in the opposite direction, said means comprising a biased plate having radial arms slidably supported in notches provided by the inner rotor cooperating with tapered cams to provide abrupt shoulders positioned on one side of the outer rotor whereby when the arms come in contact with the shoulders the rotors rotate together and extensions on the other side of the outer rotor which cooperate with tapered cams having abrupt shoulders positioned within the case whereby when the extensions come in contact with the shoulders on the case on the reverse movement of the inner rotor the movement of the outer rotor is stopped; and means for actuating the inner rotor.

6. An electric switch comprising in combination; a casing having parallel walls, one of which is provided with two circular rows of stationary contacts; a pair of concentric rotors mounted for rotation within the casing; an oscillatable driving member supported by the other wall for driving the inner rotor in either direction of rotation; bridging members yieldingly and slidably supported by each rotor for engagement with the stationary contacts; a one-way driving connection between the rotors; cooperating means provided by the inner rotor and first mentioned wall and cooperating to maintain yieldingly the inner rotor in various positions; and ratchet provisions provided by the other wall and the outer rotor operating to prevent reverse movement of the outer rotor upon reverse movement of the driving member and inner rotor.

7. An electric switch comprising in combination; a casing having parallel walls, one of which is provided with two circular rows of stationary contacts and the other with ratchet teeth; a pair of concentric rotors mounted for rotation within the casing, said outer rotor having inner and outer ratchet teeth with outer ratchet teeth cooperating with the ratchet teeth on the wall of the casing to prevent rotation of outer rotor in one direction of rotation; bridging members yieldingly supported by each rotor and arranged to engage the stationary contacts; a plate having arms carried by the inner rotor, said arms cooperating with the inner ratchet teeth of the outer rotor to drive same in one direction of rotation; cooperating means provided by the inner rotor and one wall of the casing to maintain the inner rotor in various positions; and means for driving the inner rotor in either direction of rotation.

8. An electric switch comprising in combination; a cup-shaped casing; a closure for the casing supporting two circular rows of stationary contacts; means for connecting contacts of one row with contacts of the other row; a pair of concentric rotors mounted for axial and angular movements within the casing, said outer rotor having inner ratchet teeth, and said inner rotor having projections; biased circuit closing means carried by each rotor; a plate supported within the inner rotor and having arms extending through notches provided by the inner rotor with the free ends cooperating with the inner ratchet teeth of the outer rotor to drive same in one direction of rotation, spring means for urging the inner rotor toward the closure to urge the projection into recesses provided by the closure to maintain yieldingly the inner rotor in various positions; means for driving the inner rotor in either direction of rotation; and ratchet provisions provided between the outer rotor and the housing to prevent reverse movement of the outer rotor upon reverse movement of the inner rotor.

9. An electric switch comprising in combination; a casing; a pair of concentric contact carriers, one supported within the other and adapted for angular and axial movements with respect to each other within the casing; ratchet provisions between the carriers whereby both carriers rotate together in steps in one direction of rotation, said provisions permitting the inner carrier to rotate in opposite directions; ratchet provisions between the outer carrier and the casing for preventing same from turning in the opposite direction upon reverse movement of the inner carrier; means for actuating the inner carrier in either direction of rotation; and means for limiting the angular movements of the inner carrier to a certain number of steps in either direction of rotation and whereby the inner member must be reversed at least one step before the ratchet provision between the carriers is operative to operate the outer carrier another step in the movement of steps.

10. An electric switch comprising in combination; a casing; an oscillatable contact carrier and a rotatable contact carrier supported and adapted for angular and axial movements within the casing; ratchet provisions between the carriers whereby both carriers rotate at the same time, said provisions permitting the oscillatable carrier to move in opposite directions of rotation; ratchet provisions between rotatable carrier and the casing for preventing reverse rotation of the same upon reverse movement of the oscillatable carrier; means for actuating the oscillatable carrier; and means for limiting the angular movements of the oscillatable carrier in the direction to rotate the rotatable carrier so that the oscillatable carrier must be reversed a certain angular distance before the ratchet provision between the carrier is effective to turn the rotatable carrier.

JOHN W. LAWSON.
WILLIAM EARL BROWN.

REFERENCES CITED

The following references are of record in the file of this patent:

UNITED STATES PATENTS

| Number | Name | Date |
|---|---|---|
| 1,322,870 | Briggs | Nov. 25, 1919 |
| 2,060,951 | Rae et al. | Nov. 17, 1936 |